Feb. 7, 1950    H. F. ELLIOTT    2,496,453
CONTROL APPARATUS
Filed Dec. 16, 1943    9 Sheets-Sheet 4
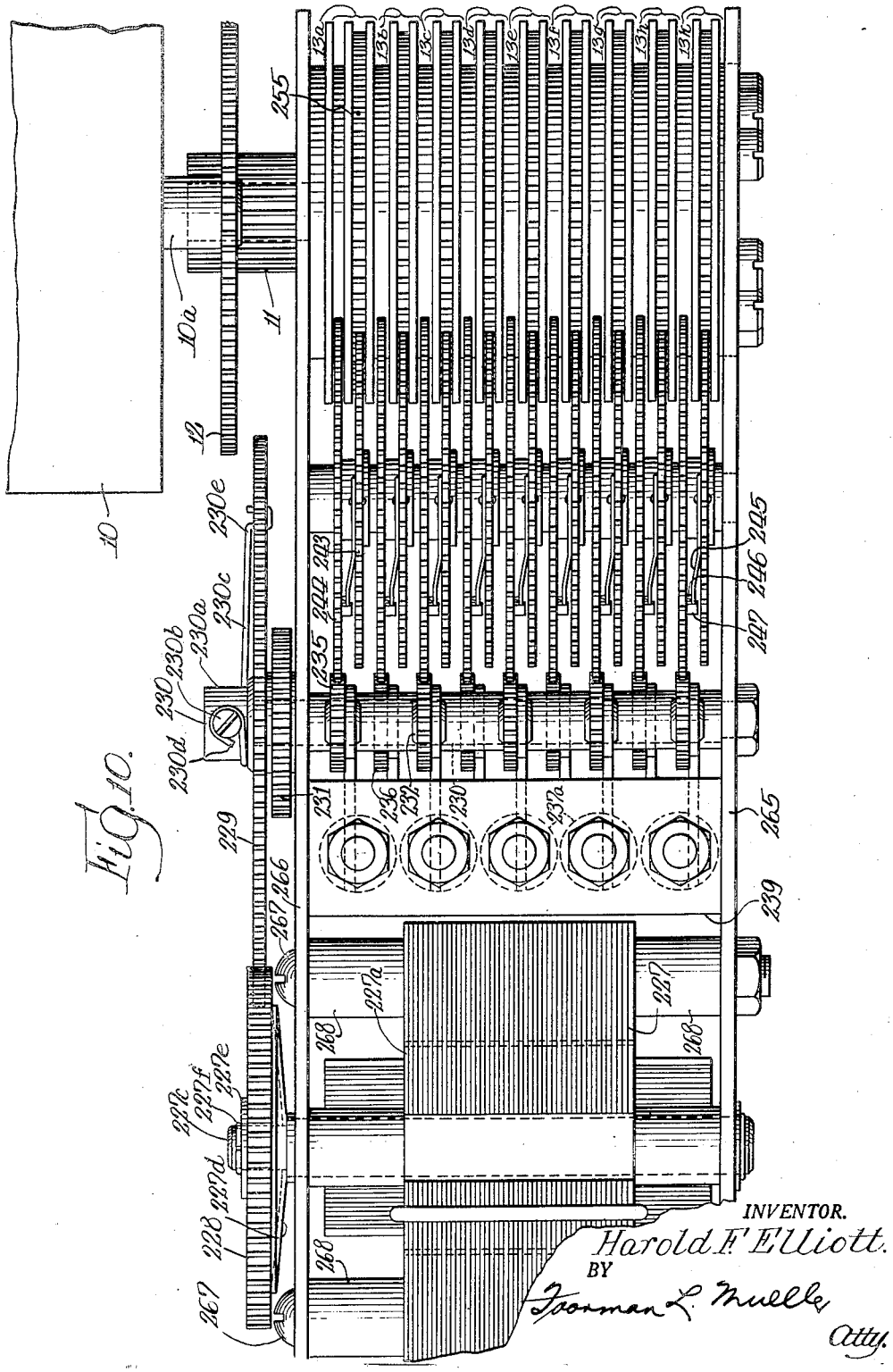
INVENTOR.
Harold F. Elliott
BY
Foorman L. Mueller
Atty.

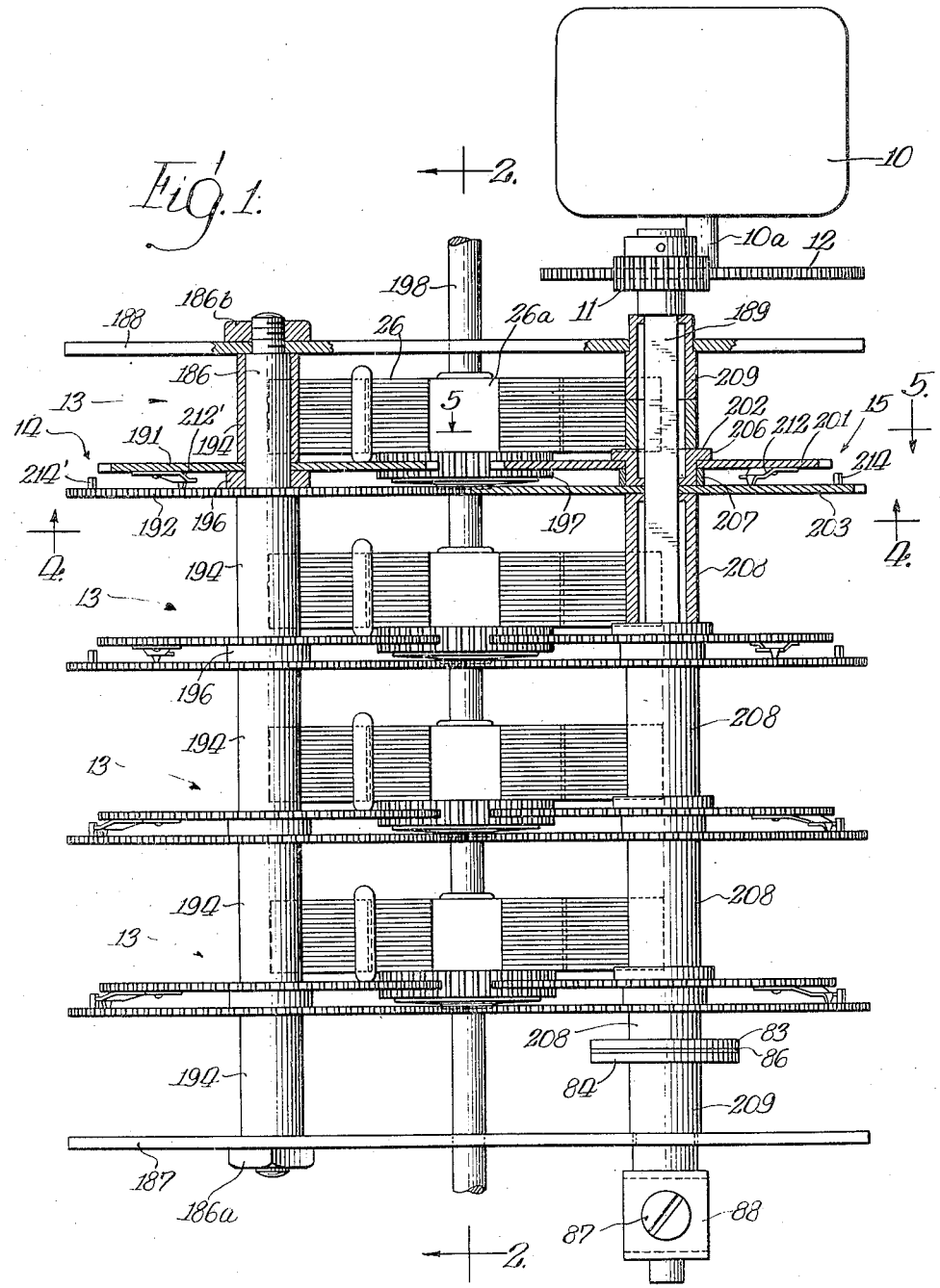

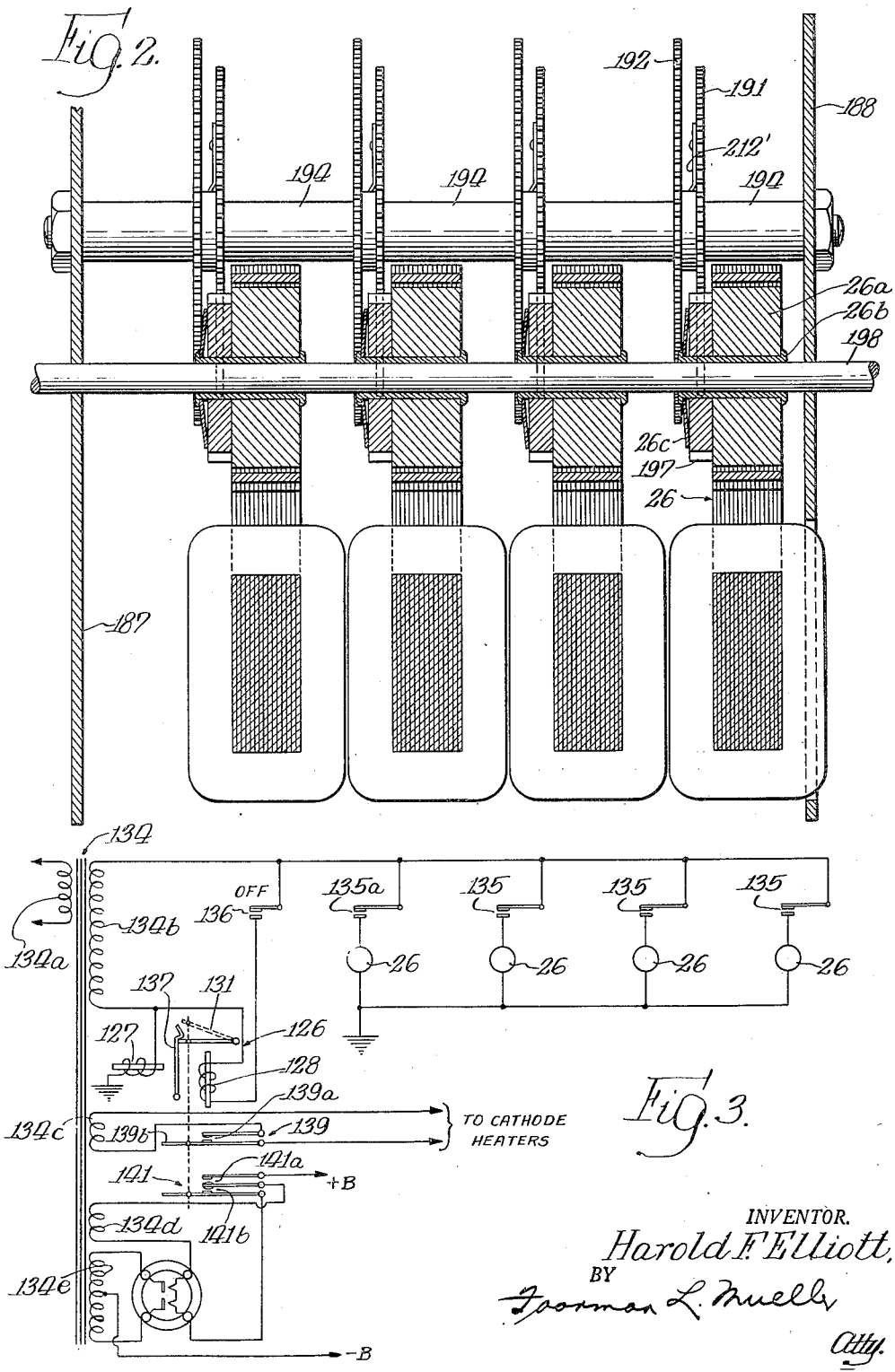

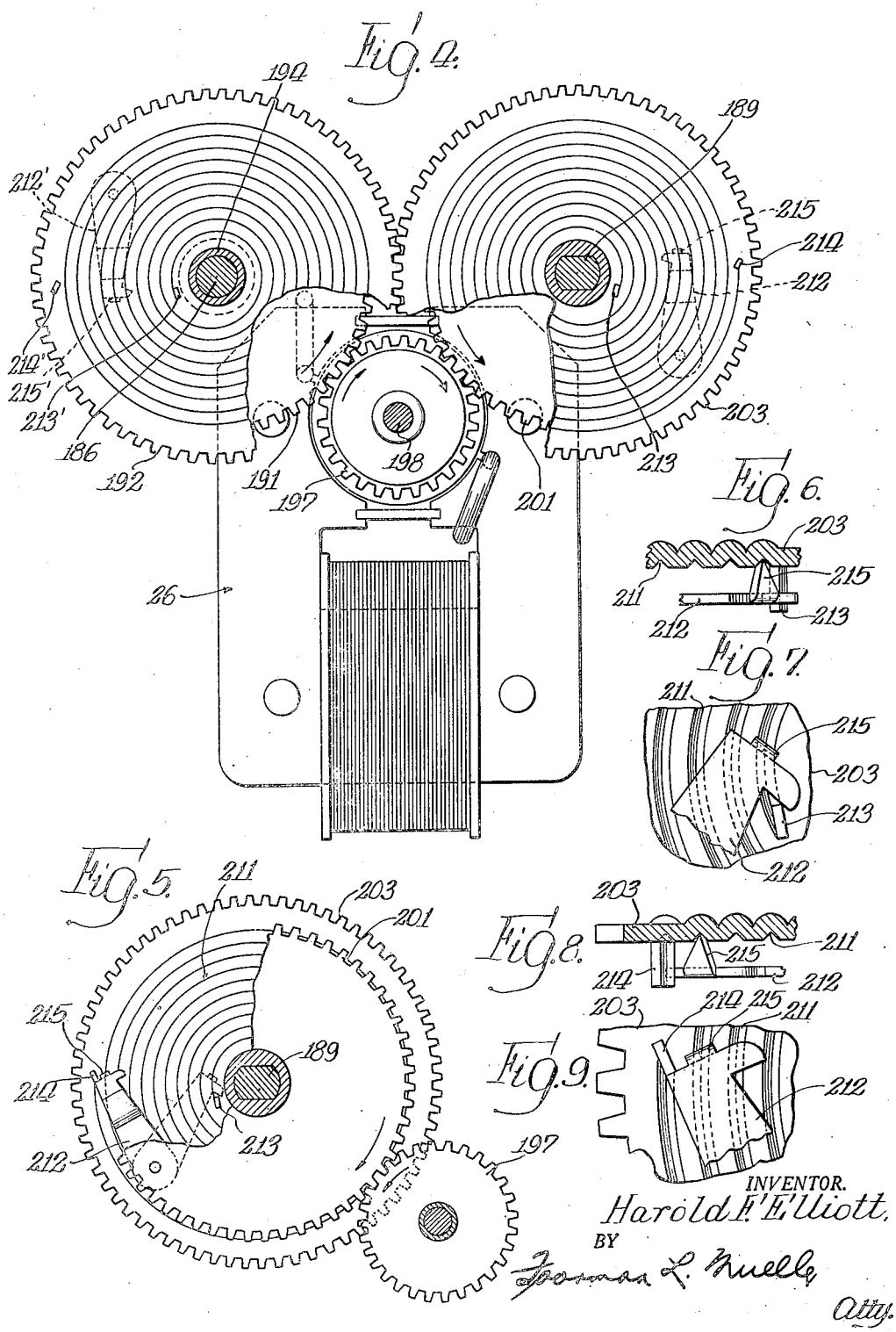

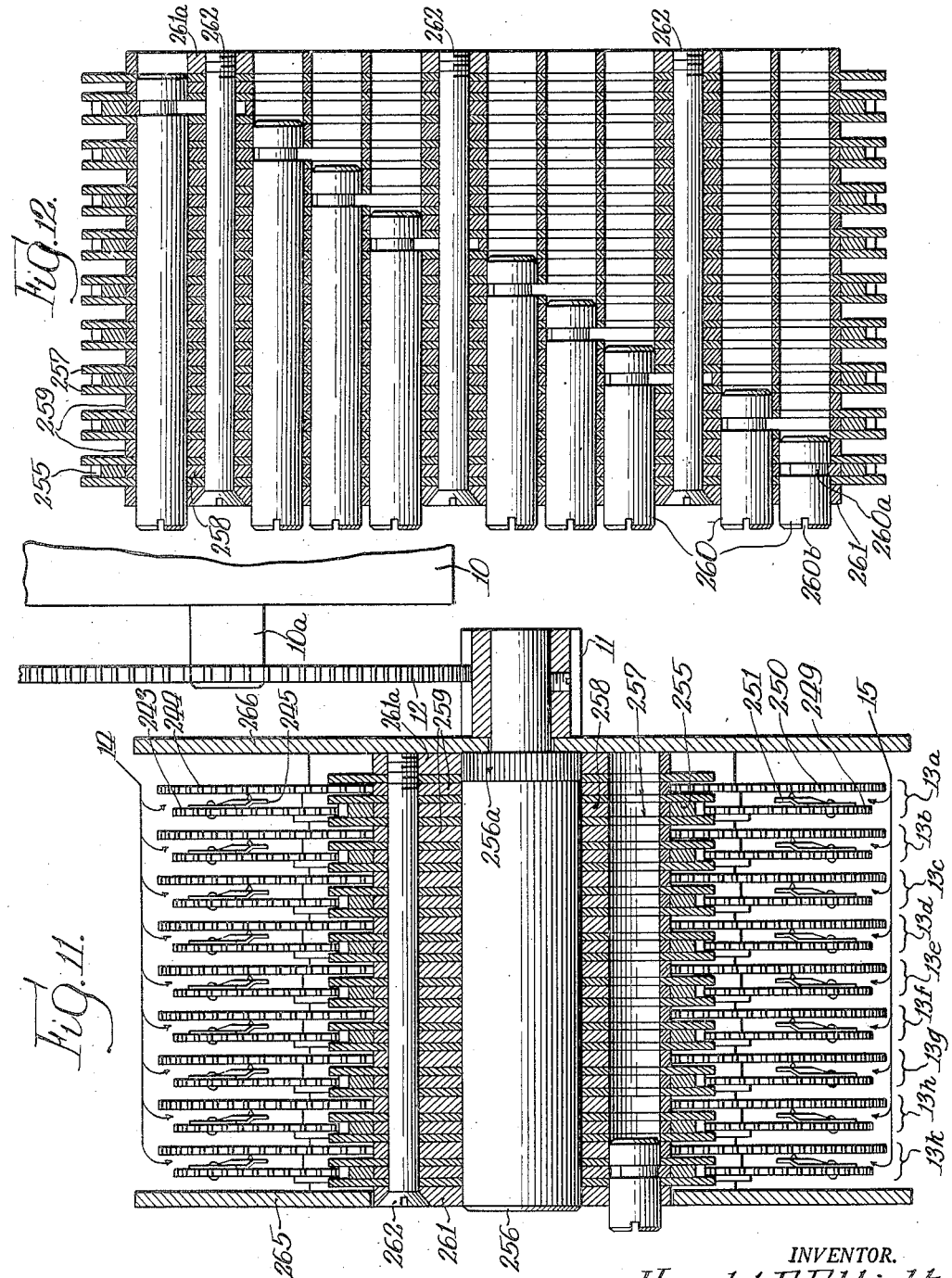

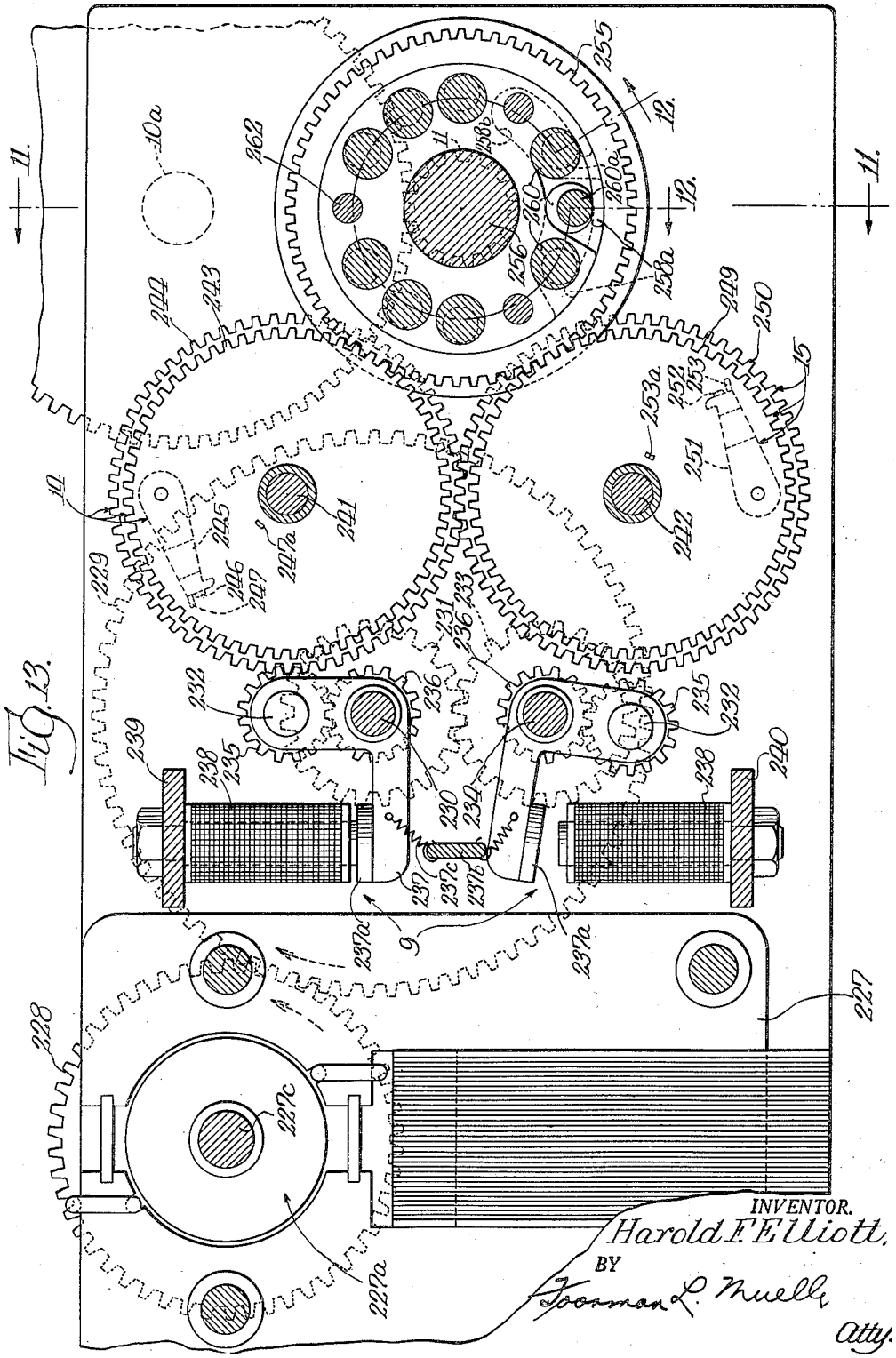

Feb. 7, 1950      H. F. ELLIOTT      2,496,453
CONTROL APPARATUS
Filed Dec. 16, 1943      9 Sheets-Sheet 7
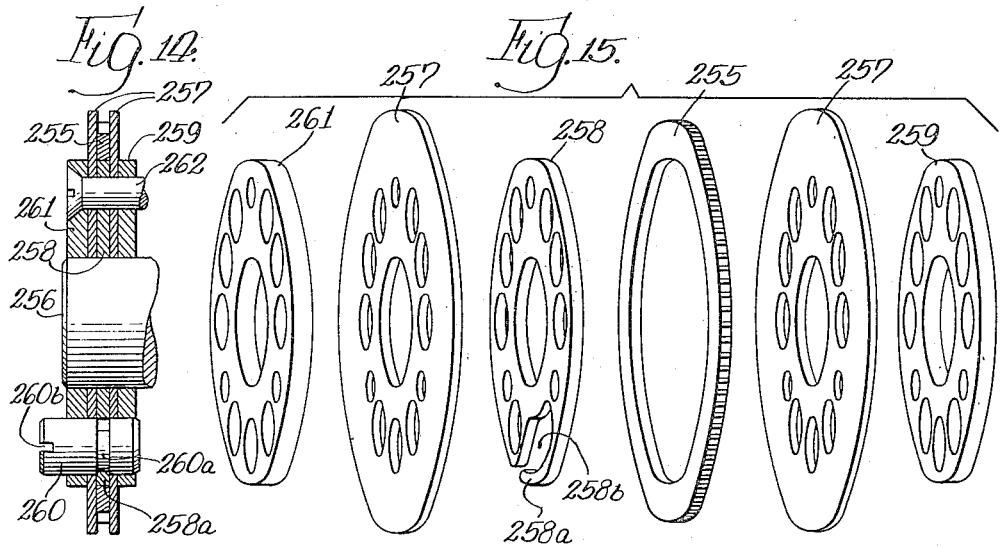
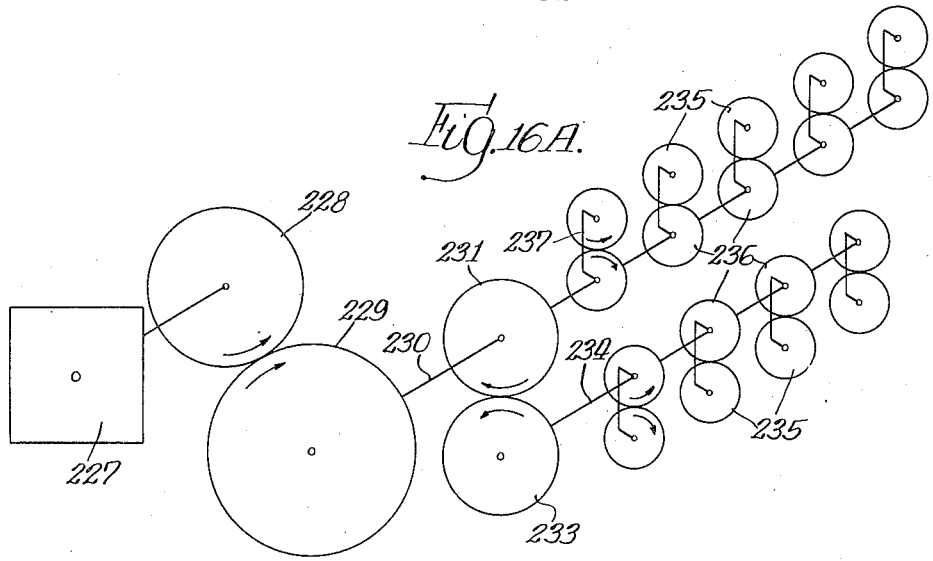
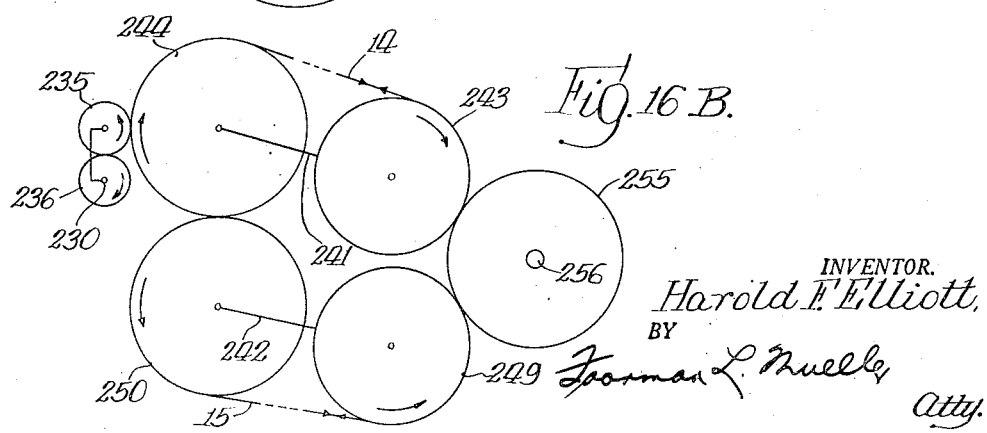
INVENTOR.
Harold F. Elliott,
BY Foorman L. Mueller,
Atty.

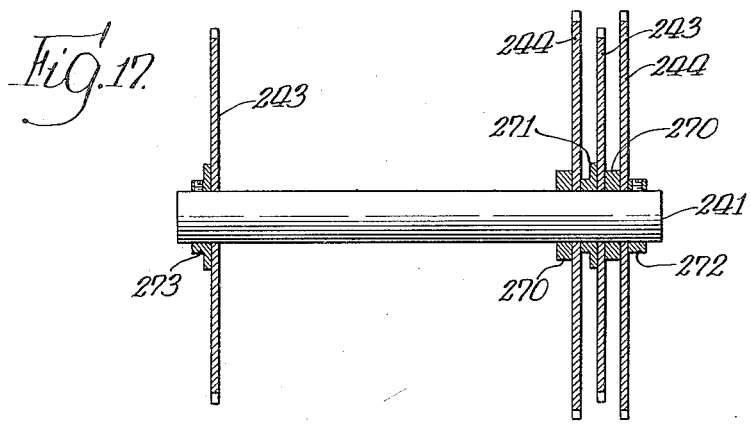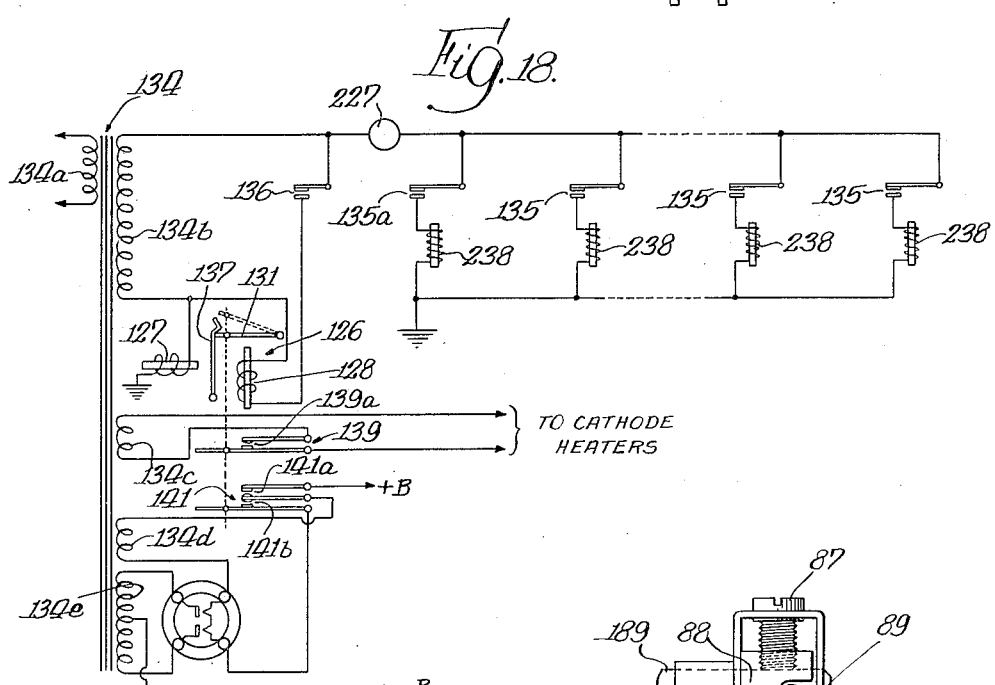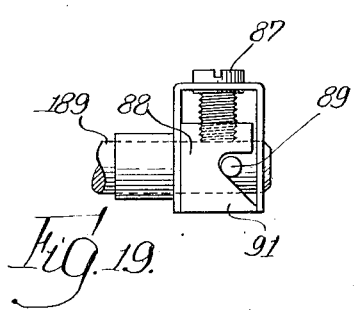

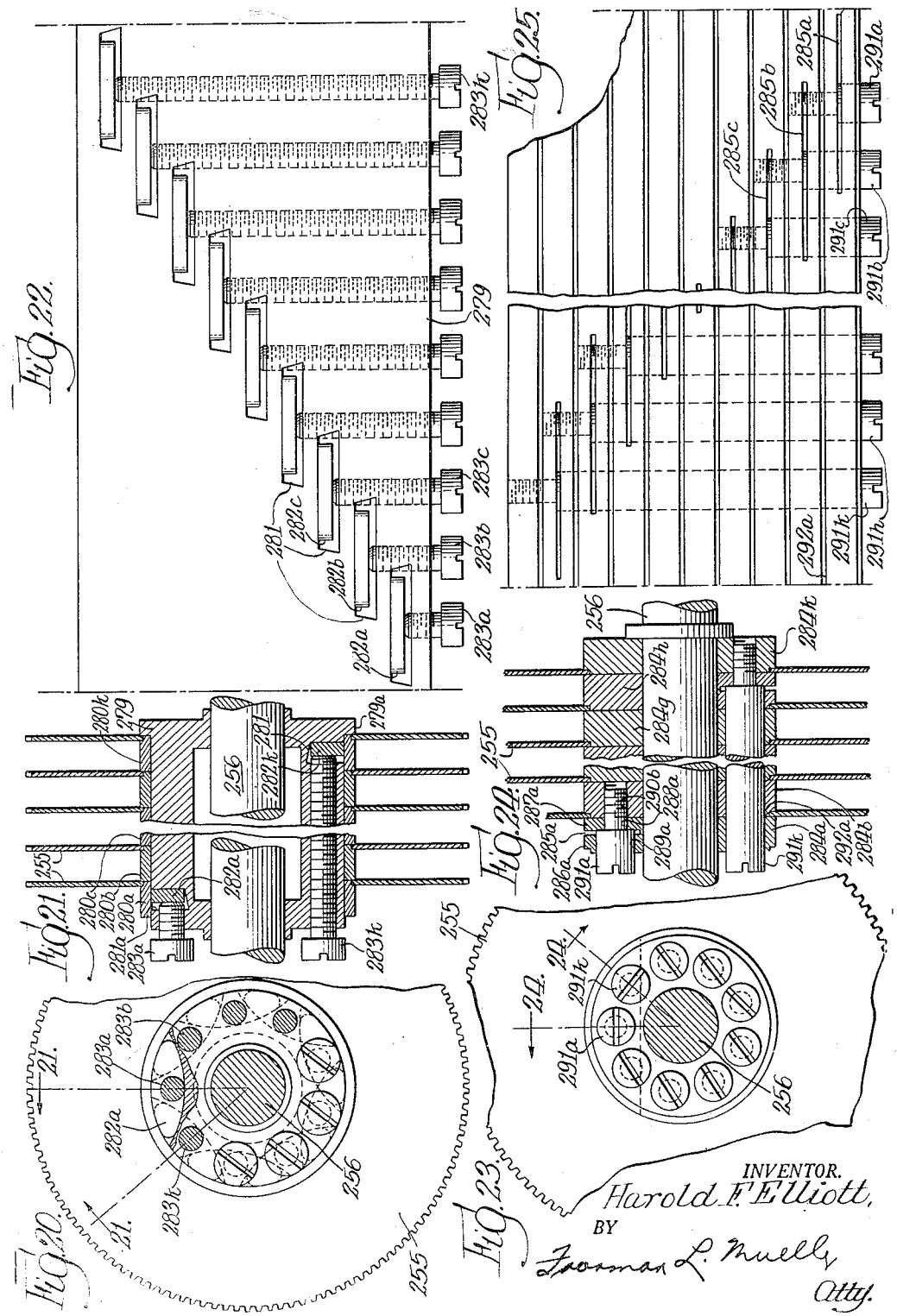

Patented Feb. 7, 1950

2,496,453

UNITED STATES PATENT OFFICE 2,496,453

CONTROL APPARATUS

Harold F. Elliott, Belmont, Mass.

Application December 16, 1943, Serial No. 514,461

23 Claims. (Cl. 74—10.2)

The present invention relates to control apparatus and more particularly to improvement in automatic tuning apparatus for radio receiving systems. This application is a continuation in part of Patent No. 2,411,617, issued November 26, 1947.

It is an object of the present invention to provide improved automatic tuning apparatus for a radio receiver, which is compact in arrangement, is of simple and inexpensive construction, and is positive and reliable in operation.

It is another object of the present invention to provide improved control apparatus in which a plurality of control units for selectively controlling the setting to which a settable element is moved, are selectively operated by individual driving motors arranged for selective energization.

According to another object of the invention, an electrical tuning system is provided in which each of a plurality of control units for driving a rotary control shaft in operative engagement with frequency changing means, is constructed to move the frequency changing means over its entire tuning range with a relatively low driving ratio, whereby the frequency changing means may be moved with precision accuracy to any desired setting.

In accordance with still another object of the invention, a pair of coacting lost-motion mechanisms are utilized in each control unit to provide the necessary connections for driving the settable element of the controlled device in either direction and for locking this element in a predetermined desired position to which it is moved, and the size of the unit in at least one dimension is minimized by arranging the lost-motion mechanisms of each control unit on parallel shafts which are common to the several control units.

According to a still further object of the invention, at least one of the lost-motion mechanisms of each control unit is comprised of a cam and cam follower assembly, thereby to provide for accurate positioning of the controlled device in an exact desired setting when the parts of the mechanism are lockingly engaged.

It is another object of the invention to provide a control unit of the character described, wherein improved facilities are utilized for releasably locking or clamping together two relatively movable parts of the unit in any desired positional relationship in order to change the setting to which the settable element of the controlled device is operated in response to actuation of the unit.

According to a further and more specific object of the invention, elongated elements extending axially of a rotary control shaft common to the control units, and rotatable relative to this shaft, are utilized to releasably lock the relatively adjustable parts of each control unit in their desired relative positions.

In accordance with still another object of the invention, all of the relatively adjustable parts of the several units, together with the facilities for releasably locking these parts in their relative adjusted positions, are mounted upon a third shaft which is separate from two parallel shafts upon which the lost-motion mechanisms are supported, thereby to provide a rugged structure and to facilitate adjustment of the relatively adjustable parts of any particular control unit.

The invention, both as to its organization and method of operation, together with further objects and advantages thereof, will best be understood by reference to the following specification taken in connection with the accompanying drawings, in which:

Fig. 1 is a fragmentary plan view illustrating improved control apparatus characterized by certain of the features of the present invention;

Fig. 2 is a side sectional view as seen along the lines 2—2 of Fig. 1;

Fig. 3 is a circuit diagram illustrating the manner of electrically energizing the driving motors individual to the control units of the apparatus shown in Figs. 1 and 2;

Fig. 4 is an end view taken along the lines 4—4 of Fig. 1, with parts thereof broken away to show the driving relationship between certain of the elements of one of the control units;

Fig. 5 is an end view as seen along the lines 5—5 of Fig. 1 illustrating certain parts of the control unit shown in Fig. 4 from the reverse side thereof;

Figs. 6, 7, 8 and 9 are fragmentary detail views of the lost-motion mechanism provided between two of the parts of the control unit shown in Figs. 4 and 5;

Fig. 10 is a fragmentary plan view illustrating a second embodiment of the invention;

Fig. 11 is an end view partially in section of the apparatus shown in Fig. 10 as seen from the right end thereof;

Fig. 12 is a view in sectional development, illustrating the details of the facilities provided in the apparatus of Fig. 10 for releasably locking each actuating element of the several control units in any desired rotary position relative to the shaft upon which these elements are mounted;

Fig. 13 is a side view of the apparatus as seen from the lower side of Fig. 10;

Fig. 14 is a side sectional view illustrating the structural arrangement provided for releasably locking the actuating element of one of the control units in an adjusted position relative to the control shaft;

Fig. 15 is an exploded view of the parts making up the assembly shown in Fig. 14;

Figs. 16a and 16b, when taken together in the manner pointed out below, diagrammatically illustrate the manner in which the rotary control shaft may be actuated through a driving connection provided by the parts of one of the control units;

Fig. 17 is a side sectional view of certain of the parts embodied in the apparatus of Fig. 10;

Fig. 18 is a circuit diagram illustrating the manner of electrically energizing the electromagnets and driving motor of the apparatus shown in Fig. 10;

Fig. 19 is a detail view of the stack clamping assembly forming a part of the apparatus shown in Fig. 1;

Fig. 20 is an end view, partially in section, illustrating a modified arrangement for releasably locking the actuating or adjustable elements to the rotary control shaft;

Fig. 21 is a fragmentary side sectional view of the locking arrangement shown in Fig. 20;

Fig. 22 is a view in development of the locking arrangement shown in Fig. 20;

Fig. 23 is an end view illustrating a third arrangement for releasably locking the actuating or adjustable elements to the rotary control shaft;

Fig. 24 is a fragmentary side sectional view of the locking arrangement shown in Fig. 23; and Fig. 25 is a view in development of the locking arrangement shown in Figs. 23 and 24.

Referring now to the drawings, and more particularly to Figs. 1 to 9, inclusive, and 19 thereof, it is pointed out that the embodiment of the invention there illustrated is also disclosed in the above-identified copending application. Accordingly, reference characters of like numerical value have been utilized to identify like parts of the apparatus as disclosed in both applications. Briefly considered, the control of the preselector apparatus there shown comprises frame means having end plates 187 and 188 which are rigidly held in spaced apart relationship by means of tie rods (not shown) extending therebetween and rigidly secured thereto. As shown in Fig. 1, the apparatus is arranged to actuate the settable tuning shaft 10a of the tuning means 10 for a radio receiving system, through a pair of engaging gears 11 and 12, and includes a stationary or fixed shaft 186 which extends between the end plates 187 and 188 and is fixedly secured thereto by means of nuts 186a and 186b. A rotary control or drive shaft 189, which carries the gear 11, is arranged parallel with the shaft 186 and is rotatably supported in the end plates 187 and 188. Disposed between the end plates 187 and 188 are a plurality of control units 13, each of which is provided with its own individual driving motor 26 and is operative to actuate the settable element 10a of the tuning means 10 to a particular setting. Briefly considered, each control unit 13 comprises its own shaded pole single phase alternating current motor 26, having a rotor 26a which is slip-clutch connected with a driving gear 197, and a pair of lost-motion mechanisms 14 and 15 respectively carried by the shafts 186 and 189.

The motor rotors 26a are all rotatably supported upon a stationary shaft 198 carried by the end plates 187 and 188. The lost-motion mechanism 14, as carried by the shaft 186, comprises two relatively movable gears 191 and 192, the first of which meshes with the motor actuated driving gear 197. The opposite lost-motion mechanism 15 of the same control unit comprises a pair of relatively movable gears 201 and 203, the first of which is also in meshing engagement with the motor driving gear 197 and the second of which is in meshing engagement with the gear 192 of the mechanism 14. The two gears of each of the two mechanisms 14 and 15 are respectively arranged to be connected for relative and concurrent movement through spiral cam and cam follower assemblies of the novel character described below.

As best shown in Fig. 2 of the drawings, the slip clutch assembly through which the driving gear 197 of each control unit is connected to be driven by the rotor 26a of the associated motor 26, comprises a sleeve 26b which is rigidly secured to the rotor 26a and serves rotatably to support this rotor upon the shaft 198. This sleeve is provided with a portion which extends axially outward from one side of the rotor 26a to rotatably support the driving gear 197. One face surface of this gear is biased into frictional engagement with the end surface of the rotor 26a by means of a spring washer 26c, which is deformed into a biasing position between the opposite side surface of the gear 197 and the spun over end portion of the sleeve 26b. With this arrangement, the frictional engagement between the side surfaces of the driving gear 197, the end surface of the rotor 26a and the peripheral edge of the washer 26c causes the gear 197 to be rotated with the rotor 26a until such time as this gear is locked against rotation through the other parts of the associated control unit in the manner explained below.

As best shown in Fig. 1 of the drawings, the gears 191 and 192 of each control unit 13 are freely rotatable on the stationary shaft 186. Each adjacent pair of gears 191 and 192 is separated by spacers 194, while the gears 191 and 192 provided in each lost-motion mechanism 14 are separated by spacers 196. The spacers 194 and 196 are also freely rotatable on the shaft 186 so as not to interfere in any way with the free rotation of the gears 191 and 192. As indicated above, each gear 191 is in meshing engagement with a motor driving gear 197. Each driving gear 197 is also in engagement with a gear 201 which is freely rotatable on a sleeve or bushing 202 mounted on and splined to the rotary drive shaft 189. Each adjustable element or gear 203 is normally adjustably fixed on the shaft 189 and is in continuous engagement with the associated gear 192 carried by the shaft 186. Each spacer or bushing member 202 is formed with a shoulder portion 206 and a reduced section for carrying the gear 201. A spacer 207 is mounted on the reduced section of the bushing 202 between the gear 201 and the adjustable element 203. Also, the gear 201 and element 203 of each control unit 13 are separated from the next adjacent control unit by spacers 208, the control unit adjacent the end plates 187 and 188 being separated from these plates by collar or spacer members 209. Adjustment of the adjustable element 203 relative to the control shaft 189 to a particular desired position is permitted by the frictional engagement of this element with the reduced section of the bushing 202 and one end of the adjacent spacer member 208, as is clearly indicated in Fig. 1 of the drawings. The frictional pressure serving to latch the adjustable elements 203 of the respective control units to the rotary shaft 189 is controlled by the clamping unit 88 shown in Fig. 19 of the drawings, and the spring washer assembly 83—86. More specifically, this assembly comprises a pair of washers 83 and 84 separated by a spring washer 86 and disposed between the inner ends of the spacer member 209 and the adjacent end of the adjacent spacer member 208. On separation of the washers 83 and 84, force exerted by the dished spring washer 86 is released until the adjustable elements 203 of the control units 13 are permitted to rotate relative to the shaft 189 under but slight pressure from the spring washer 86, whereby these elements are rendered freely movable to adjusted positions in the manner more fully described below. When the washers 83 and 84 are clamped together, the spring washer 86 functions to press the spacer members 202 and 208 of each control unit together to engage opposite sides of the associated element 203, thereby to clamp this element in the position to which it has been adjusted. The clamping action of the washers 83 and 84 is controlled by manipulation of a set screw 87 which is positioned in a thrust member or clamp 88. By virtue of the engagement of the pin 89 in the tapered slot 91 formed in the sides of the member 88, adjustment of the set screw 87 acts to move the member 88 away from or toward the control units 13 to control the action of the washers 83 and 84 on the spring washer 86 in the manner explained above.

As shown in Figs. 6 to 9, inclusive, each adjustable element 203 is formed with a corrugated face portion 211 to provide a spiral cam groove arranged for traversal by a lever or traversing arm 212. This arm is pivotally supported on the adjacent face of the gear 201, and is formed with a pointed follower 215 which rides in the spiral corrugations of the gear 203. Thus, the spirally corrugated face portion of the gear or adjustable element 203 functions as a spiral cam and the traversing arm 212 functions as a cam follower, the two named elements coacting to provide a lost-motion connection between the gear 201 and the gear or adjustable element 203. It is to be understood that the illustrated corrugated structure as shown in Figs. 6 to 9, inclusive, is applicable to all of the adjustable elements 203 shown in Figs. 1 and 2 of the drawings. As shown in Fig. 4, each of the gears 192 is also formed with a corrugated face portion 211' of spiral arrangement while each of the corresponding gears 191 is provided with a pivotally supported traversing arm 212', the manner of engagement of the traversing arm with the spiral groove in the face of the gear 192 being exactly as shown in Figs. 6 to 9, inclusive, for the corresponding parts of the lost-motion mechanism 15. Thus, a spiral cam and cam follower assembly is utilized in each of the lost-motion mechanisms 14 to provide the desired relative movement between the gears 191 and 192 in each of these units. From an examination of Fig. 4, it will be noted that the spiral groove as formed in the face of the gear 192 radiates outward from the axis of the shaft 186 in a direction which is opposite the direction of radiation of the spiral groove in the adjustable element 203 from the axis of the shaft 189. The travel of the traversing arm 212 in response to rotation of the gear 201 in one direction is limited by an inner abutment or stop 213 while the limit of the traversing arm travel in response to rotation of the gear 201 in the opposite direction is limited by an outer abutment or stop 214, the abutments 213 and 214 being integrally formed in the adjustable element 203 in any desired manner. The travel of the traversing arm 212', as pivotally supported upon the gear 191, is similarly limited by the stop or abutment members 213' and 214' which are integral with the gear 192 and are disposed at either end of the spiral groove provided in the face of this gear.

For the purpose of selectively controlling the energization of the motors 26 as provided in the control apparatus individual to the several control units, the control circuit illustrated in Fig. 3 of the drawings may be employed. Briefly considered, this circuit comprises a transformer 134 having a primary winding 134a adapted to be connected to a suitable commercial frequency source of alternating current and a secondary winding 134b from which current for selectively energizing the motors 26 is delivered. The transformer 134 also includes a low voltage winding 134c for supplying cathode heating current to the heaters of the tubes provided in the radio receiver equipped with the illustrated control apparatus. Two additional secondary windings 134d and 134e are provided which are included in the illustrated full wave rectifying circuit, this circuit being utilized to supply the screen and anode potentials required by the various tubes provided in the receiver. In order selectively to control the energization of the motors 26, the cathode heating circuit, and the circuit over which +B voltages are delivered to the screen and anode electrodes of the tubes, switching equipment is provided which includes an off switch 136, push-button switches 135 individual to the various motors 26, and a relay switching unit indicated generally at 126. This unit includes two mechanically interlocked magnets 127 and 128 having switch spring assemblies 139 and 141 operatively associated therewith.

In considering the operation of the control apparatus as described above, it may be assumed that the movable parts of the control circuit as illustrated in Fig. 3 of the drawings occupy the positions there shown and that the uppermost control unit 13 illustrated in Fig. 1 of the drawings is to be utilized in actuating the tuning means of the receiver to the particular setting corresponding to the station which it is desired to receive. In order to initiate the operation of this control unit, the push button switch 135a associated therewith is actuated to its closed circuit position, thereby to complete a circuit for energizing the motor 26 individual to this control unit. This circuit includes the secondary winding 134b of the transformer 134 and the winding of the magnet 127. When energized in this circuit the magnet 127 attracts its associated latching armature 137, thereby to release the spring biased armature 131 of the magnet 128. The arm 131 in moving to its retracted position, closes the contacts 139a to complete the cathode heater circuit, and at the contacts 141a and 141b, completes the high voltage rectifying circuit in an obvious manner.

When the motor 26 of the selected control unit is energized, the driving gear 197 is driven through the rotor slip clutch assembly in the direction indicated by the arrow as seen in Fig. 4 of the drawings. Upon rotation of this driving gear, the two gears 191 and 201 are driven in a counterclockwise direction to provide for a traversal of the arms 212 and 212' over the corrugated portions 211 and 211' of the gears 203 and 192, respectively. The gear 192 will remain stationary until coupling engagement thereof with the gear 191 is established through the spiral cam and cam follower by engagement of the cam follower 212' with the inner stop or abutment 213', or until a driving connection to the gear 192 is established through the lost-motion mechanism 15 in response to engagement of the arm or cam follower 212 with the outer stop or abutment 214. Similarly, the adjustable element or gear 203 remains in a stationary position until the arm 212 engages the stop 214 to establish a driving connection through the gears 197 and 201, or until the arm 212' engages the stop 213' to establish a driving connection through the gears 191 and 192. More specifically, as the gear 191 is rotated in a counterclockwise direction by the driving gear 197, the follower portion 215' of the arm 212', in its engagement with the spiral groove formed in the face of the gear 192, is pivoted in a counterclockwise direction so that the follower end thereof is moved toward the shaft 186 or toward a position for engagement with the stop 213'. Similarly, as the gear 201 is rotated in a counterclockwise direction the cam follower 215 of the arm 212 follows the spiral cam formed in the surface of the adjustable element 203 so that the free end thereof is pivoted outward toward the stop or abutment 214.

Assuming that the parts of the operating control unit 13 are initially so positioned relative to each other that during the operation of this unit the arm 212 is moved to engage the stop 214 before the arm 212' engages the stop 213', a driving connection is established for rotating the adjustable element 203 in a counterclockwise direction, this driving connection including the engaged gears 197 and 201, the arm 212 and the stop 214. As the adjustable element 203 is rotated through this driving connection, the shaft 189 upon which the element 203 is rigidly mounted, is also rotated in a counterclockwise direction to drive the settable element 10a of the tuning means 10 toward the desired predetermined position. Incident to the rotation of the shaft 189, the gear 192, which meshes with the gear or adjustable element 203, is rotated in a clockwise direction about the shaft 186, thereby to increase the speed of relative movement between the gear 192 and the gear 191. Thus the speed with which the arm 212' is moved toward the stop 213' is substantially increased. Also incident to the rotation of the shaft 189, the adjustable elements 203 respectively provided in the other control units are rotated to drive their respective engaging gears 192.

During continued operation of the control unit and more particularly when the two gears 191 and 192 are relatively so positioned that the arm 212' is moved into locking engagement with the stop 213', a locking connection is established through the several parts of the control unit to arrest the rotation of the rotary control shaft 189, the settable element 10a and the motor driving gear 197. This locking connection is established by virtue of the engagement of the two traversing arms 212 and 212' with their respective associated stops 214 and 213', the toothed engagement between the three gears 191, 197 and 201, and the toothed engagement between the gear 192 and the adjustable element or gear 203. Thus, operation of the settable element 10a is arrested when this element is moved to the predetermined position to which the control unit corresponds. After the locking connection through the parts of this unit is established, the rotor 26a of the energized motor 26 continues to rotate, relative movement between this rotor and the driving gear 197 being permitted through the slip clutch connection provided between these parts by the spring washer 26c. In this regard it will be understood that when the settable element 10a of the tuning means 10 is operated to the position corresponding to the operating control unit, the particular desired station is tuned in for reception to inform the operator that the tuning operation has been completed. Accordingly, the operator may release the push button switch 135a to deenergize the driving motor of the control unit which is utilized to perform the desired tuning operation. Incident to the release of this push button, the winding of the magnet 127 is also deenergized permitting the spring biased armature 137 of this magnet to move toward its locking position.

Assuming now that the parts of the particular control unit selected for operation are initially so positioned relative to each other that during operation of the control unit the arm 212' is moved to engage the stop 213' before the arm 212 is moved to a position in engagement with the stop 214, a driving connection for the adjustable element 203 is established which includes the engaged parts of the lost-motion mechanism 14 and the gear 192. In this case, the adjustable element 203 and the shaft 189 are rotated in a clockwise direction toward the predetermined position corresponding to the operating control unit. As a result, the speed of relative movement between the arm 212 and the cam groove which the follower portion 215 of this arm engages, is substantially increased. Here again, when the arm 212 is moved to a position for engagement with the stop 214, a locking connection is established through the engaged parts of the control unit to arrest the operation of the rotary control shaft 189 and the adjustable element 203. During the described reverse or clockwise movement of the adjustable element 203 and the rotary control shaft 189, the movable parts of the nonactive control units are also moved to produce unlocking relative movement between the cam and cam follower parts of one of the lost-motion mechanisms provided in each control unit. This fact will be more fully apparent from the following explanation relating to the movement of the parts provided in the control unit shown in Fig. 4 of the drawings when the rotary control shaft 189 is driven by another of the control units.

Assuming now that the rotary control shaft 189 has been operated to the setting corresponding to the control unit shown in Fig. 4 of the drawings, such that the arm 212 engages the stop 214 and the arm 212' engages the stop 213', and that the shaft 189 is rotated by a second control unit in a clockwise direction, the stop 214 remains in engagement with the arm 212 to provide a driving connection through the gear 201 and the gear 197 for rotating the gear 191 and the arm 212' in a clockwise direction about the shaft 186. Concurrently, the adjustable element 203 in its clockwise rotation drives the meshing gear 192 in a counterclockwise direction. With the two gears 191 and 192 rotating relative to each other in the directions indicated, the arm 212' is moved away from the stop 213', and due to engagement of the cam follower 215' with the spiral cam provided in the face of the gear 192, the lower end of this arm is pivoted outward away from the stationary shaft 186. The described movement of the named parts of the control unit shown in Fig. 4 of the drawings, is of course arrested when the rotary control shaft 189 is moved to the particular setting which corresponds to the operating control unit.

If, with the parts of the control unit shown in Fig. 4 of the drawings in locking engagement, a third control unit is actuated to drive the rotary control shaft 189 in a counterclockwise direction, the adjustable element 203 is rotated in a like direction. Due to the toothed engagement between the element 203 and the gear 192, the latter element is of course rotated in a clockwise direction to drive the gear 191 in the same direction through the connection provided by the engaged stop 213' and arm 212'. With the gear 191 rotating in a clockwise direction, the gear 201 is of course rotated in a corresponding direction. The relative movement thus produced between the gear 201 and the adjustable element 203 causes the arm 212 to be backed away from the stop 214 and to be pivoted inward toward the shaft 189 in a manner which will be clearly apparent from the above explanation.

From the above explanation it will be clearly apparent that the rotary control shaft 189 and the settable element 10a actuated thereby may be moved to any desired setting through operation of a particular control unit without any interference whatever from the nonactive control units. This is due to the fact that during operation of any one of the control units to establish the desired setting for the shaft 189, the parts of at least one of the lost-motion mechanisms provided in each of the nonactive control units are so moved relative to each other as to back the cam follower of the mechanism away from its associated stop. Thus, the two lost-motion mechanisms as provided in each control unit and as respectively mounted upon the two parallel shafts 186 and 189, permit the rotary control shaft 189 to be freely, accurately and positively driven in either direction to any one of the predetermined settings respectively corresponding to the several control units.

If at any time it is desired to turn off the receiver after a period of operation, the off switch 136 may be momentarily operated to its closed circuit position, thereby to complete an obvious circuit for energizing the winding of the magnet 128. This magnet in attracting its associated armature 131, opens the contacts 138a to deenergize the cathode heaters of the tubes provided in the receiver. At the contacts 141a and 141b, the magnet 128 opens the B supply circuits to the tubes and deenergizes the cathode heaters of the full wave rectifying tube provided in the rectifying circuit. As the armature 131 is moved to its attracted position, the free end thereof rides over the latching portion of the armature 137. After the switch 136 is released to deenergize the winding of the magnet 128, therefore, the armature 131 is held in its attracted position by the latching armature 137 of the magnet 127.

In order individually to adjust the adjustable elements 203 of the various control units relative to the rotary control shaft 189, thereby to provide for operation of this shaft to the desired predetermined settings by the various control units, the screw 87 in the clamping mechanism 88 is withdrawn until the adjustable elements 203 are freed for rotation relative to the control shaft 189. The shaft 189 is then adjusted to a desired control position or setting by a suitable manual control knob (not shown) provided for manually actuating the settable element 10a of the frequency changing means 10. While the shaft 189 is held in this position by manually gripping the control knob, the switch 135 associated with the particular control unit which is to be utilized in operating the rotary control shaft 189 to the manually established setting, is operated to energize the driving motor 26 of this control unit. This motor now drives the movable parts of the selected control unit until these parts are lockingly engaged in the manner explained above. Thus the adjustable element 203 of the operated control unit is actuated to a position relative to the rotary control shaft 189 such that when the two named elements are subsequently locked together, the control unit can thereafter only operate the rotary control shaft to the particular setting which it occupies when the locking operation is completed. The above-described procedure may be repeated for each of the other control units 13, in order to establish the other predetermined settings desired for the rotary control shaft 189. During each setting operation, the adjustable elements 203 of the control units which are not being adjusted are maintained in adjustment because of the fact that their frictional engagement with the bushings 202 and spacer members 208 is sufficient to maintain their relative positions upon the shaft 189. It will be understood in this regard that the spring washer 86 maintains all parts on the shaft 189 always under sufficient pressure for this purpose. When all of the control units 13 have been adjusted, the screw 87 may be tightened to frictionally lock all of the adjustable elements 203 in fixed positions relative to the shaft 189.

In the modified arrangement illustrated in Figs. 10 to 16, inclusive, of the drawings, the tuning means 10 of a radio receiver is adapted to be actuated to any one of a plurality of different settings, respectively corresponding to different stations, by a single driving motor 227. This motor is arranged to rotate the settable shaft 10a of the tuning means 10 through any one of a plurality of driving connections which commonly include the illustrated gears 228, 229, 11 and 12, and individually include the control units 13a, 13b, 13c, 13d, 13e, 13f, 13g, 13h and 13k. These control units are arranged to be selectively clutched to the drive shaft 230 upon which the gear 229 is mounted by means of nine electromagnetic clutching units individually associated therewith.

More specifically considered and as best shown in Fig. 10 of the drawings, all parts of the control apparatus are supported between or upon two spaced-apart parallel extending frame members 265 and 266. These members may have suitable tie rods extending therebetween and anchored thereto at the end portions thereof for the purpose of enhancing the rigidity of the structure. The motor 227 is supported between the two plates 265 and 266 by means of four bolts 267 which extend transversely between the two plates and are passed through suitably spaced apart openings extending transversely of the motor field structure. Spacing sleeves 268 disposed on either side of the field structure and telescoped over the bolts 267 are utilized to clamp the field structure of the motor 227 in a position midway between the two frame members 265 and 266. This motor is provided with a rotor shaft 227c suitably journaled in the frame members 265 and 266 and rigidly mounting the rotor 227a. The shaft 227c is slip clutch connected to the driving gear 228 through a slip clutch assembly which comprises a dish shaped spring washer 227d, an assembly washer 227e and a spring retaining ring 227f. More specifically, the rotor shaft 227b is provided at its projecting end with a portion of reduced diameter to provide a shoulder against which the outer peripheral surface of the spring washer 227d may bear. The outer peripheral surface of this washer is in tensioned engagement with the adjacent side surface of the driving gear 228, the washer being maintained under tension by the retaining ring 227f which lies within a groove cut at the extreme outer end of the shaft 227c. This ring bears against the assembly or friction washer 227e which in turn engages the outer surface of the driving gear 228. It is noted in this regard that the driving gear 228 is freely rotatable relative to the shaft 227c so that the only driving connection provided between the two named elements is that supplied by the described friction clutch assembly.

As best shown in Figs. 10 and 13 of the drawings, the nine identified control units are arranged between the two frame members 265 and 266 and each includes parts carried by three parallel extending shafts 241, 242 and 256. The two shafts 241 and 242 are stationary and are fixedly supported by the members 265 and 266 at the respective ends thereof. The third shaft 256 constitutes the rotary control shaft and is journaled in the frame members 265 and 266 in the manner pointed out below. This shaft has the gear 11 set screw mounted thereon at the end thereof which is adjacent the settable element 10a of the tuning means 10. The nine control units, which are axially disposed along the three shafts 241, 242 and 256, are of identical construction and arrangement. Accordingly, the arrangement of these units will be readily understood from a consideration of the control unit 13k, the parts of which are detailed in Figs. 10, 13 and 14 of the drawings.

In brief, this control unit comprises two lost-motion mechanism 14 and 15 respectively carried by the two shafts 241 and 242, and an adjustable element 255 which is in driven engagement with the two lost-motion mechanisms and is rotatable with the rotary control shaft 256. More specifically considered, the lost-motion mechanism 14 comprises two gears 243 and 244 which are spaced apart axially along the shaft 241 and are freely rotatable on this shaft for relative movement therebetween. In order to establish a driving and locking connection between the two gears 243 and 244, a spiral cam and cam follower assembly is provided therebetween which is of the exact character and construction previously described with reference to Figs. 6 to 9, inclusive, of the drawings in the consideration of the first embodiment of the invention. This assembly includes a traversing arm 245 pivotally supported upon the smaller gear 243 near the periphery thereof and provided with a cam follower 246 engaging a spiral cam groove formed in the opposite surface of the gear 244. At the ends of this spiral groove, stop or abutment elements 247 and 247a are provided, each of which is adapted to be engaged by the free end of the arm 245 to arrest relative movement between the two gears 243 and 244 and thus provide a direct connection between these gears. The lost-motion mechanism 15 similarly comprises two gears 249 and 250 which are spaced apart axially along the shaft 242 and are freely rotatable about this shaft for relative movement therebetween. A direct drive connection may be established between the two enumerated gears through a spiral cam and cam follower assembly which comprises the traversing arm 251 pivotally supported upon the gear 249 adjacent the outer periphery thereof and provided with a cam follower 252 which engages a spiral groove formed in the opposing face of the gear 250. At each end of this spiral cam groove, stop or abutment elements 253 and 253a are provided, each of which is adapted to be engaged by the free end of the traversing arm 251 after a predetermined amount of relative movement between the two gears 249 and 250, thereby to provide a locking or driving connection between these two gears. The two smaller gears 243 and 249 of the two lost-motion mechanisms are not engaged with each other, but are in continuous meshing engagement with the adjustable element 255 carried by the rotary control shaft 256. The two larger gears 244 and 250 of the lost-motion mechanisms 14 and 15 are in continuous meshing engagement with each other and are arranged to be driven from the drive shaft 230 through the associated electromagnetic clutching unit 9. In brief, this unit comprises a pinion 236 mounted for rotation with the shaft 230 and arranged in meshing engagement with an idler pinion 235, pivotally supported by means of a pivot pin 232 upon an L-shaped rocker arm 237 which is loosely mounted upon the shaft 230. At its projecting end, the rocker arm 237 carries an armature piece 237a which is adapted to be attracted into engagement with the pole face of an electromagnet 238, thereby to move the pinion 235 into meshing engagement with the gear 244, in response to energization of the winding of this magnet.

In the interests of enhancing the compactness of the structure, the clutch units 9, respectively associated with alternate ones of the control units 13, alternately extend inward from the upper and lower edges of the two frame members 266 and 265. Thus, the clutch unit 9 individual to the control unit 13k is illustrated in Fig. 13 of the drawings as extending downward from the upper edge of the frame member 265, whereas the clutch unit 9 individual to the next adjacent control unit 13h extends upward from the lower edge of the frame member 265. The electromagnets 238 of the upper group of clutch units 13k, 13g, 13e, 13c and 13a are all bolted to a crossbar 239 which extends transversely between the two frame members 265 and 266 and is anchored to these members at the ends thereof. The electromagnets of the four lower clutch units 13h, 13f, 13d and 13b are similarly bolted to a crossbar 240 which extends transversely between the two frame members 265 and 266 and is likewise suitably anchored to these frame members at the ends thereof. With this arrangement, it is necessary to drive the four control units 13h, 13f, 13d and 13b through the gears 250 individual thereto. Accordingly, the movable parts 232, 235, 236 and 237 of the clutch units individual to the four enumerated control units are carried by a shaft 234 which is suitably journaled in the frame members 265 and 266 and is connected to be driven from the shaft 230 through a one to one driving connection which comprises the meshing gears 231 and 233 respectively mounted for rotation with the shafts 230 and 234. The idler pinions 235 of the clutch units individual to the four control units 13h, 13f, 13d and 13b are thus arranged to be pivoted into meshing engagement with the gears 250 of the respective associated control units in response to energization of their associated electromagnets 238. In order normally to bias the rocker arm 237 of each clutch assembly to a position wherein the idler pinion 235 of the assembly is disengaged from the associated gear 244 or 250, each rocker arm is spring connected through a coil spring 237c to a stop bar 237b which extends transversely between the two frame members 265 and 266 and is anchored to these frame members at its ends. This bar is positioned to be engaged by the projecting end of each rocker arm 237 and thus serves to limit the back stroke of each rocker arm when its associated electromagnet is deenergized.

The motor 227 is of the unidirectional type and may be so arranged that its rotor 227a and the driving gear 228 are rotated in a counterclockwise direction as viewed in Fig. 13 of the drawings. With the driving gear 228 rotating in this direction and as will be seen from Fig. 16a, the idler pinions 235 carried by the upper shaft 230 are rotated in a counterclockwise direction, whereas the pinions 235 carried by the lower shaft 234 are rotated in a clockwise direction. Accordingly, when any selected idler pinion 235 is actuated into meshing engagement with its associated gear 244 or 250, the meshing engagement between the pinion and engaged gear produces a force which acts to pull the pinion into meshing engagement with the engaged gear, thereby to lock the two elements in mesh during the tuning operation. Since this meshing engagement holds the armature piece 237a in its attracted position against the magnet pole face, a mechanical pressure urging the armature piece toward the pole face occurs concurrently with the electrical attraction of this piece by the pole face, whereby the magnet is aided in operating the movable parts of the clutch assembly. The magnets 238, therefore, need only be large enough to attract the armature piece into engagement with the pole faces of their respective associated magnets. This utilization of the mechanical reaction between any one of the pinions 235 and engaged one of the gears 244 and 250 provides for the use of relatively small magnets 238, since the magnet merely functions to initially engage the pinion with its associated gear; the pulling of the pinion into meshing engagement with the gear being sufficient to maintain the geared or interlocked engagement between the two elements so long as the pinion is rotating. The biasing springs 237c individual to the several clutching units insure positive disengagement of the pinion 235 embodied in any actuated unit when the electromagnet of the unit is deenergized upon completion of a tuning operation. The described gear engagement may be further assured by providing a spring member 230c which is anchored at one end 230d to the shaft 230 by means of an anchor screw 230b, and at its opposite end 230e is connected to the gear 229. The gear 229 is rotatable relative to the shaft 230, and the spring 230c is arranged so that it is wound up when the motor 227 is driving the shaft 230 through the gears 228 and 229. When the tuning means is operated to a selected setting in the manner explained below, the driving gear train is locked. Thereafter and when the motor 227 is deenergized, the spring 230c backspins the rotor of the motor and thus assists in disengaging the operated clutch assembly.

The gears 243, 244, 249 and 250 are assembled upon their respective associated shafts 241 and 242 in the manner best illustrated in Fig. 17 of the drawings. As there shown, the gears 243 and 244 are freely rotatable about the shaft 241 and are held in spaced-apart positions axially along this shaft by means of spacing washers 270 and spacing bushings 271. These spacing elements, in cooperation with the collars 272 and 273 which are set screw mounted upon the ends of the shaft 241, cooperate to prevent movement of the gears 243 and 244 axially of this shaft. The manner of assembling the gears 249 and 250 upon the stationary shaft 242 is exactly similar to the mode of assembly of the gears 243 and 244 upon the shaft 241.

As previously pointed out, the adjustable elements 255 individual to the several control units are spaced axially along the third or rotary control shaft 256. Each adjustable element 255 is in the form of a ring gear which is rotatably supported upon an annular locking ring 258 of slightly greater thickness than the ring gear. Along either side surface each locking ring 258 is engaged by an annular spacing ring 257 of slightly greater diameter than the outer peripheral diameter of the ring gear 255. Intermediate each adjacent pair of spacing rings 257 an additional annular spacing member 259 is provided. In the assembly of the named parts carried by the shaft 256, these parts are arranged in a stack between two end or assembly plates 261. The parts of this stack are maintained in clamping engagement by means of three assembly screws 262 which are spaced angularly about the shaft 256, extend through registering openings formed in the parts 257, 258 and 259, and are threaded into tapped drill holes provided in the end plate 261a. As shown in Fig. 11 of the drawings, a driving fit between the inner periphery of the end plate 261a and the illustrated annular serrated surface 256a of the shaft 256 is utilized to lock the stack against movement relative to the shaft 256 so that a driving connection may be provided between any driven one of the control units and the gear 11. At the outer end of the serrated surface 256a, the shaft 256 is of reduced diameter, so that a shoulder is provided which cooperates with the inner end of the gear 11 to provide a bearing groove within which the adjacent bearing portion of the frame member 266 is disposed. The outer peripheral surface of the end plate 261 is journaled within an opening provided in the opposite frame member 265 to complete the bearing support for the shaft 256 and the parts assembled thereon.

The facilities for releasably locking or clamping the adjustable elements 255 in the desired angular position relative to the shaft 256 include a plurality of elongated camming elements 260, individual to the respective control units, which are radially disposed about the shaft 256 and extend in directions parallel to the axis of this shaft. These elongated camming elements each extend through registering openings provided in the end assembly plate 261, the spacing members 257 and 259, and the locking rings 258, and are each provided with an eccentrically cut camming portion 260a which is adapted to coact with an integrally formed resilient portion 258a of the associated locking ring 258. More specifically, each resilient clamping finger 258a is formed by cutting an elongated slot 258b in the locking ring 258 at the proper position around this ring for receiving the camming portion 258a of the associated elongated camming element 260 therewithin. The dimensions of this slot as provided in each locking ring are such that when the associated camming element is assembled therewith, the clamping finger 258a thereof rides in the slot providing the eccentric portion 260a of this element and against the surface of this portion of the camming element. With this arrangement and due to the bearing engagement of each camming element with the parts of the structure through which it extends, the eccentric portion 260a acts during rotation of the element to move the engaged clamping finger 258a into and out of clamping engagement with the associated adjustable element 255 along a path which extends radially of the shaft 256. Due to the inherent resiliency of each locking finger 258a, this finger will follow the eccentric camming surface of the engaging camming element during rotation of this element. In order to facilitate rotation of the camming elements relative to the other parts of the structure, each thereof is provided at its projecting end with a transverse slot for receiving the blade of a screwdriver or other suitable adjusting tool. As best shown by the developed illustration of the adjustable element assembly shown in Fig. 12 of the drawings, each camming element 260 only penetrates the structure of stacked elements 261, 257, 258 and 259 to a depth required for engagement of its eccentric portion 260a with the clamping finger 258a of the associated locking ring 258. Thus the lowermost camming element 260 only penetrates the structure to a depth required for engagement of its eccentric portion 260a with the clamping finger 258a of the locking ring upon which the adjustable element 255 of the control unit 13k is rotatably supported. The next adjacent camming element 260 is of course of slightly greater length and penetrates the structure to a depth permitting engagement of the eccentric portion 260a thereof with the locking ring 258 individual to the control unit 13h. Thus, the camming elements individual to the various control units are of progressively increasing lengths. In the assembly of the camming elements with the other parts of the stack structure, the eccentric portion of each camming element is interfitted with the slotted portion 258b of its associated locking ring 258 before the two interfitted parts are assembled onto the other parts of the structure. This operation is necessary in order to permit each camming element to be rotated to a position where it may be aligned with the openings in the other parts through which it will extend when the assembly is completed. Thus, the stacking operation may best proceed by adding the parts to the structure in the order of increasing length of the camming elements. The resulting assembled structure is compact in arrangement, relatively light in weight, and provides for relative adjustment of any adjustable element relative to the shaft 256 and positive locking of any adjustable element in any selected position to which it is moved.

As shown in Fig. 18 of the drawings, the control circuit for the embodiment of the invention illustrated in Figs. 10 to 17, inclusive, is substantially similar to that provided for controlling the embodiment of the invention shown in Figs. 1, 2 and 4 to 9, inclusive, of the drawings. The principal differences between the two circuits relate to the substitution of the electromagnets 238 for the motors 26 and the series inclusion of the common driving motor 227 in the common portion of the circuits for energizing the respective electromagnets 238. Otherwise, the control circuit shown in Fig. 18 of the drawings is the same as that illustrated in Fig. 3 of the drawings.

In considering the operation of the control apparatus illustrated in Figs. 10 to 17, inclusive, of the drawings and described above, it may be assumed that the push button switch 135a corresponding to the control unit 13k is operated to its closed circuit position. In response to this operation, the electromagnet 127 functions to effect energization of the rectifier circuit and the cathode heater circuit of the receiver in the exact manner previously explained. Also incident to closure of the switch 135a, the winding of the electromagnet 238 individual to the control unit 13k is energized in series with the field windings of the driving motor 227. When the motor 227 is thus energized, the shaft 230 is rotated through a driving connection which includes the meshing gears 229 and 228, and the slip clutch assembly which connects the gear 228 with the rotor shaft 227c of the motor. As best shown in Fig. 16a of the drawings, the shaft 230 and the pinions 236 carried thereby are rotated in a clockwise direction through this driving connection. Due to engagement of the gear 231 with the gear 233, the shaft 234 and the pinions 236 carried thereby are rotated in a counterclockwise direction when operation of the motor 227 is initiated. Thus, driving connections are established for rotating the idler pinions 235 carried by the shaft 230 in a counterclockwise direction and for rotating the idler pinions 235 carried by the shaft 234 in a clockwise direction.

Incident to energization of the electromagnet 238 individual to the control unit 13k, the pole piece 237a of the clutch unit associated with this control unit is attracted, whereby the rocker arm 237 of the clutch unit is pivoted about the shaft 230 to move the idler pinion 235 of the unit into engagement with its associated gear 244. Thus, a driving connection is established between the motor 227 and the relatively movable parts of the control unit 13k. Upon rotation of the gear 244, this gear and the meshing gear 250 are driven in opposite directions to provide for a traversal of the arms 245 and 251 over the spirally grooved portions of the two associated gears 244 and 250, respectively. The gear 243 will remain stationary until coupling engagement thereof with the gear 244 is established through the spiral cam and cam follower in response to engagement of the cam follower 245 with one of the two stop elements 247 and 247a, the particular stop element engaged depending upon the direction of radiation of the spiral cam groove from the axis of the shaft 241. When the traversing arm or cam follower 245 is engaged by the stop 247, for example, a driving connection is established between the two gears 244 and 243. Similarly, the gear 249 remains stationary until the arm 251 engages one of the two stops 253 and 253a, or a driving connection for this gear is established through the adjustable element 255. Here again, the particular stop engaged again depends upon the direction of radiation of the spiral cam groove from the axis of the shaft 242. When the arm 251 engages the stop 253, for example, a locking or driving connection is obviously established between the two gears 250 and 249.

From the above explanation it will be understood that the mode of operation of the two lost-motion mechanisms 14 and 15 of the actuating control unit 13k is exactly the same as described above with reference to the embodiment of the invention illustrated in Figs. 1 to 9, inclusive. It will be understood, therefore, that during operation of this unit, a point is reached at which the adjustable element 255 and the rotary control shaft 256 are rotated in one direction or the other through one of the two lost-motion mechanisms 14 or 15. It will also be understood that when the rotatable control shaft 256 is rotated to the predetermined setting to which the control unit 13k corresponds, all parts of the control unit are locked against further relative movement through the engagement of the adjustable element 255 with the two gears 243 and 249 and the engagement of the traversing arms 245 and 251 with their respective associated stop elements 247 and 253. In fact, the entire driving connection extending back to the motor 227 is brought to a stop when the parts of the control unit 13k are locked up through the two lost-motion mechanisms 14 and 15. Thus, movement of the parts included in the driving connection between the motor 227 and the settable element 10a of the tuning means 10 is arrested when the settable element 10a is operated to the position corresponding to the control unit 13k. This will be more clearly apparent from a consideration of the parts as schematically illustrated in Figs. 16a and 16b of the drawings. When the driving connection is locked up in the manner just explained, relative movement between the rotor shaft 227c of the motor 227 and the driving gear 228 is permitted through the slip clutch connection between these two parts. During the rotation of the rotary control shaft 256, the gears 243 and 249 of the nonactive control units 13a to 13h, inclusive, are obviously driven through the adjustable elements 255 of these nonactive units, and the resulting movement of the parts within the nonactive control units causes the elements of at least one lost-motion mechanism in each nonactive unit to be disengaged in a manner which will be clearly apparent from the foregoing explanation.

When the new setting of the settable element 10a for the tuning means 10 is established in the manner just explained, the operator will be apprised of this fact through reception of the desired station and may release the push button switch 235a to deenergize the driving motor 227 and the energized electromagnet 238 in an obvious manner. When the named electromagnet is deenergized, its associated rocker arm 237 is spring actuated by the associated spring 237c to its normal position wherein the idler pinion 235 of the actuated clutching unit is disengaged from its associated gear 244. The manner in which the remaining control units may, through selective energization of the magnets 238 by the push button switches 135, be actuated for the purpose of driving the settable element 10a to its other predetermined positions, will be clearly apparent from the above explanation with reference to the operation of the control unit 13k.

In order individually to adjust the adjustable elements 255 of the various control units relative to the rotary control shaft 256, thereby to provide for operation of this shaft to the particular settings desired, the camming elements 260 may be individually rotated to their unlocking settings to permit relative movement between their respective associated adjustable elements 255 and the rotary control shaft. Thus, when the shortest camming element 260 individual to the control unit 13k is rotated to a setting wherein the high point of the eccentric portion 260a thereof is disposed radially inward toward the shaft 256, the engaged clamping finger 258a of the associated locking ring 258 is disengaged from the inner peripheral surface of the adjustable element 255. After the locking connection between the shaft 256 and the adjustable element 255 is thus broken, the shaft 256 may be adjusted to a desired control position or setting by a suitable manual control knob (not shown) for the settable element 10a of the frequency changing means 10. While the shaft 256 is held in this position by manually gripping the control knob, the switch 135a associated with the control unit 13k is operated to energize the driving motor 227 and to engage the idler pinion 235 of the clutching unit individual to the control unit 13k with the gear 244 of this control unit. The motor 227 is thus rendered operative to drive the movable parts of the control unit 13k until these parts are lockingly engaged in the manner explained above. Thus, the adjustable element 255 of the control unit 13k is actuated to a position relative to the setting of the rotary control shaft 256, such that when the two named elements are subsequently locked together, the control unit can thereafter only operate the rotary control shaft to the particular setting which it occupies when the locking operation is completed. After the relative positions of the adjustable element 255 and the rotary control shaft 256 are thus established, the camming element 260 may be rotated until the eccentric portion 260a thereof produces a locking connection between its engaged clamping finger 258a and the inner periphery of the adjustable element 255. The above-described procedure may be repeated for each of the control units 13 in order to establish the other predetermined settings desired for the rotary control shaft 256, it being apparent that each camming element 260 requires individual actuation in order to release and then relock the associated adjustable element 255 relative to the control shaft 256.

Referring more particularly to Figs. 20, 21 and 22 of the drawings, modified facilities are there illustrated for releasably locking or clamping the adjustable elements 255 in the desired angular positions relative to the rotary control shaft 256. As there shown, each adjustable element or gear 255 is rigidly mounted upon the shouldered portion of a thin annular ring 280 which is slidable axially of and snugly embraces the outer peripheral surface of a sleeve 279. This sleeve is keyed or otherwise rigidly connected to the control shaft 256. Each element 255 may be spot welded or otherwise secured to the shouldered portion of its associated ring 280, the indicated rings, when arranged in their end-to-end relationship axially of the sleeve 279, serving to maintain the required spacing between the adjustable elements 255. At its right end as viewed in Fig. 21 of the drawings, the sleeve 279 is provided with an annular flange 279a which serves as an abutment against which the ring 280k may bear to establish the desired positions of the adjustable elements 255 axially along the shaft 256.

In order individually to lock the rings 280 against movement relative to the sleeve 279, each such element has associated therewith a cam locking assembly which comprises a cam element 282 disposed in a slot 281 cut transversely through a sector of the sleeve 279, and a cam actuating screw 283 which is threaded into the sleeve 279 and extends axially thereof. More specifically and as best shown in Figs. 20 and 22 of the drawings, the respective cam locking assemblies are disposed in different angular positions about the shaft 256 so that the screws 283 may occupy different and non-interfering angular positions within the sleeve 279. In this regard, it will be understood that the slots 281 are spaced axially along the sleeve 279 so that each thereof is disposed directly beneath an associated one of the rings 280. Each slot 281 may be in the form of a saw cut and terminates at an inner camming surface which is slanted relative to the shaft axis in the manner shown in Fig. 21 of the drawings, so that the associated camming element 282 is faced radially outward when this element is moved axially of the shaft by the associated screw 283. Each screw is threaded into a tapped drill hole which extends axially of the sleeve 279 and bisects the associated cam receiving slot 282.

In considering the manner in which the screws 283 may be selectively actuated for the purpose of releasably locking their respective corresponding adjustable elements 255 relative to the control shaft 256, it may be assumed that with the rings 280 and adjustable elements assembled on the sleeve 279, the adjustable element 255 carried by the ring 280a is to be rotated to a predetermined position relative to the shaft 256. To this end, the screw 283a is backed away from the camming element 282a a sufficient distance to permit this element to be disengaged from the collar 280a. Following such disengagement of the elements 280a and 282a, the shaft 256 may be rotated to any desired position relative to the ring 280a without disturbing the settings of the other rings 280. After the desired setting for the ring 280a is thus established, the screw 283a may be driven inward to move the camming element 282a up the camming surface of the slot 281a, thereby to force the outer arcuate edge of this camming element against the inner peripheral surface of the ring. After engagement of the elements 280a and 282a is established and during continued driving of the screw 283a, the camming element 282a is tightly clamped between the inner surface of the ring 280a and the camming surface of the slot 281a. As a result, the ring 280a and the adjustable element 255 carried thereby are tightly locked or clamped to the sleeve 279 in the desired angular position relative to the shaft 256. The other cam locking assemblies may be selectively actuated for the purpose of releasing and then relocking their respective associated rings 280 in new settings relative to the sleeve 279 and the shaft 256 in exactly the manner described above.

In the modified locking arrangement illustrated in Figs. 23, 24, and 25 of the drawings, each of the adjustable elements 255 is rotatably supported upon the shouldered portion of an associated annular ring 284. These rings are rigidly connected for rotation with the rotary control shaft 256. More specifically, the inner peripheral portion of each adjustable element 255 is seated upon a bearing surface 292 of reduced diameter which is formed by turning the associated ring 284 around the left edge of its outer periphery as viewed in Fig. 24 of the drawings. The axial width of the seat 292 thus formed is slightly less than the transverse thickness of the seated adjustable element 255. With this arrangement, the rings 284 not only serve to support the adjustable elements 255 for rotation relative to the shaft 256, but, in addition, serve to maintain the required axial spacing therebetween.

Clamping screws 291 disposed radially about the shaft 256 and extending axially thereof are utilized in cooperation with portions of the supporting and spacing rings 284 to releasably lock the adjustable elements 255 against rotation relative to the shaft 256. These screws are individual to the adjustable elements and extend different distances into the stacked ring assembly. More specifically, a sector of each ring is divided axially of the shaft 256 into two parts 286 and 287 by splitting the ring radially inward from the outer periphery thereof to provide a slot 285. Centrally of this slot as provided in each ring, the portion 287 of the ring is drilled to provide an opening 288 for receiving the shank portion of a clamping screw 291. In axial coincidence with this drill hole the portion 286 of each ring is counter-bored to provide an opening 289 for receiving the enlarged head portion of the screw 291. The threaded shank portion of each clamping screw is adapted to be threaded into a tapped opening 290 drilled into the last ring 284 which the particular screw penetrates. Thus and as best shown in Fig. 24 of the drawings, the shank portion of the clamping screw 291a is threaded into a tapped opening 290b provided in the ring 284b, which opening is axially aligned with the openings 288a and 289a of different diameters respectively provided through the portions 287a and 286a of the preceding ring 284a. When, therefore, the screw 291a is threaded into the opening 290b, the enlarged head portion thereof engages the portion 287a of the ring 284a to tightly clamp one sector of the associated adjustable element 255 between the ring portion 287a and the adjacent assembly ring 284b. This clamping operation may obviously be carried out without in any way altering the position of the ring portion 286a.

From the above explanation it will be understood that each ring 284 is provided with a number of openings therethrough around the face surface thereof. Thus the ring 284a not only includes the two openings 288a and 289a mentioned above, but is additionally provided with eight equiangularly spaced apart openings for accommodating the enlarged head portions of the eight other clamping screws. The second ring, i. e., the ring 284b of the set is provided with the threaded opening 290b. At the next adjacent angularly displaced screw position this ring is also provided with the aligned openings 289b and 288b through the portions 286b and 287b thereof. At the other seven screw positions of the ring 284b, openings are provided for receiving the enlarged head portions of the clamping screws 291c, 291d, etc. The third assembly ring 284c on the other hand, is only provided with openings at eight of the angularly displaced clamping screw positions therearound, i. e., a threaded opening 290c for receiving the threaded shank of the clamping screw 291b, the openings 288c and 289c of different diameters intermediate the slot 285c therein, and six openings for receiving the enlarged head portions of the clamping screws 291d, 291e, etc. The remaining sets of aligned openings in the ring 284c, which number six in all, are similarly arranged at the other six angularly displaced clamping screw positions about the shaft 256. It will thus be apparent that the clamping screws 291a, 291b, 291c, etc., are required to enter the ring stack for different distances and accordingly are of progressively increasing lengths. More specifically, the threaded shank portions of these screws are of the same length, only the enlarged head portions of the screws being of progressively increasing lengths.

From the above explanation it will be clearly apparent that by the simple expedient of unscrewing its associated clamping screw 291, any one of the adjustable elements 255 may be released for rotation relative to the shaft 256. It will also be apparent that when the desired relative positions of the shaft and the selected adjustable element are established, the associated clamping screw 291 may be tightened to positively clamp the adjustable element against rotation relative to the shaft 256. This selective adjustment of any desired one of the adjustable elements 255 is acomplished, moreover, without in any way releasing the clamping pressure which maintains each of the other adjustable elements in its set position relative to the shaft 256.

It will be understood from the preceding description that the elements of the assembly for adjustably supporting the adjustable elements 255 upon the shaft 256 are assembled upon the shaft in the order of decreasing length of the respective associated clamping screws. Thus the adjustable element 255 to be supported by the ring 284k is first assembled upon the shouldered portion of this ring, following which the ring 284h is telescoped over the end of the shaft into engagement with the inner peripheral portion of the assembled adjustable element 255. The ring 284h may now be rotated until the openings 288a and 289a thereof are brought into registry with the opening 290b of the ring 284k, following which the clamping screw 291k may be inserted through the openings 289h and 288h and threaded into the opening 290k. The second adjustable element 255 may now be assembled upon the shouldered portion of the ring 284h, after which the ring 284g may be telescoped over the shaft 256, with the screw 291k being received within the proper opening through the ring 284g to insure alignment of the openings 289g and 288g with the opening 290h of the ring 284h. After the ring 284g has thus been brought into engagement with the inner peripheral portion of the adjustable element carried by the ring 284h, the clamping screw 291h may be inserted through the aligned openings 289g and 288g and threaded into the tapped opening 290h of the ring 284h. The manner in which the remaining elements of the assembly are added to the stack in progressive fashion will be clearly apparent.

From the preceding explanation, it will be clear that in each of the three disclosed arrangements for releasably locking the adjustable elements 255 gaainst rotation relative to the shaft 256, each element 255 may be released for adjustment without in any way disturbing or releasing the locking connection provided between each of the other elements and the shaft. Thus positive and accurate positioning of the elements 255 relative to the shaft 256 is insured. It will be noted further that the locking structures require only a small amount of space and a relatively small number of parts. Accordingly, any one of the three disclosed structures may be manufactured in production quantities at low cost. The operations required to assemble the parts of any one of the structures are, moreover, exceedingly simple and may be performed with practically no possibility of error.

While different embodiments of the invention have been disclosed, it will be understood that various modifications may be made therein without departing from the scope of the invention as defined in the appended claims.

I claim:

1. In apparatus which includes driving means for moving the tuning element of a radio receiver to a predetermined setting, a control unit for arresting the movement of said tuning element when moved to said predetermined setting and comprising, in combination, a pair of parallel shafts, coacting lost-motion mechanisms respectively carried by said shafts, and means including said lost-motion mechanisms for arresting the movement of said tuning element when said tuning element is moved to said predetermined setting.

2. In apparatus which includes driving means for moving the tuning element of a radio receiver to a predetermined setting, a control unit connected between said driving means and said tuning element to actuate said tuning element in response to operation of said driving means and comprising, in combination, a pair of parallel shafts, lost-motion mechanisms respectively carried by said shafts and respectively operative to provide driving connections for moving said tuning element toward said predetermined setting from reverse directions, and means including said lost-motion mechanism for locking said tuning element against continued movement when said tuning element is moved to said predetermined setting from either direction.

3. In apparatus for variably setting a control device in any one of a plurality of different settings, a pair of parallel shafts, a plurality of control units disposed axially along said parallel shafts and each corresponding to one of said settings, each of said control units including two coacting lost-motion mechanisms respectively carried by said parallel shafts, and means including said control units for selectively operating said device to any one of its settings.

4. In apparatus which includes driving means for variably moving a control device to any one of a plurality of different settings, a pair of parallel shafts, a plurality of control units connected between said driving means and said control device and each operative to actuate said control device in response to operation of said driving means, each of said units including two lost-motion mechanisms respectively carried by said shafts and respectively operative to provide driving connections for moving said control device in different directions, and means including the lost-motion mechanisms of any operated one of said control units for locking said control device against continued movement when said control device is moved to the particular setting corresponding to the one unit.

5. In apparatus for variably moving a settable element to any one of a plurality of different settings, a plurality of control units each connected in driving relationship with said settable element and with each other and each corresponding to a different setting of said element, each of said control units including a pair of coacting lost-motion mechanisms for arresting the operation of said settable element when said element is operated to the corresponding one of its settings, a pair of parallel shafts common to said control units and each supporting one of the lost-motion mechanisms of each control unit, means relatively positioning said supported parts of said control units axially of said shafts, and means for selectively driving said settable element through the parts of any one of said control units.

6. In a control unit, a pair of parallel shafts, a pair of rotatable elements respectively carried by said shafts and connected in driving relationship for rotation in the same direction, a pair of gears connected in driving relationship and respectively carried by said shafts, and lost-motion means connecting each of said rotatable elements with the one of said gears carried by the same shaft, whereby one of said gears is rotated in one direction when driven by the other gear and in the opposite direction when driven by the connecting lost-motion means, and means coacting with said lost-motion means for locking said one gear against rotation when it is rotated to a predetermined setting.

7. In control apparatus having a rotary control shaft and a stationary shaft, a control unit including a pair of members relatively freely rotatable on said stationary shaft and an engaging member mounted on said control shaft, with one of said rotary members and engaging member being in continuous meshing engagement, coupling means for said rotary members including a traversing arm pivotally mounted on a side portion of the other of said rotary members, said one rotary member being formed on one side thereof with a spiral groove having an abutment at one of its ends, with said traversing arm having an end portion adapted to ride in said groove, said coupling means being operable on rotation of said other rotary member to lock said rotary members in a fixed relative position to operate said control shaft, and a motor driven gear in operative engagement with said other rotary member.

8. In control apparatus having a rotary control shaft and a stationary shaft, a plurality of control units, each of said control units including a pair of rotary members relatively freely movable on said stationary shaft and an engaging member mounted on said control shaft, with one of said rotary members and engaging member being in continuous meshing engagement, a gear freely rotatable on said control shaft, means for locking said pair of rotary members and said gear and engaging member in fixed relative positions defining a predetermined control position of said rotary shaft, and means for driving said rotary members and said gear and engaging member until they are moved to said fixed relative positions.

9. In control apparatus which includes a rotary control shaft having a number of different control settings, a pair of parallel shafts, a plurality of control units arranged axially along said parallel shafts and each corresponding to one of said settings, each of said control units including a plurality of parts which are collectively operative to rotate said control shaft to a particular setting and to then arrest the rotation of the control shaft, certain of the parts of each control unit being carried by one of said parallel shafts and others thereof being carried by the other parallel shaft, and a plurality of motors individual to said control units and each connected in driving relationship with one of the parts of the associated control unit.

10. In a control unit for moving a settable element in either direction to a predetermined position, a rotatable element operatively connected with said settable element and rotatable in one direction to move said settable element in a corresponding direction, a cam and cam follower assembly connected with said rotatable element, driving means for producing relative movement between said cam follower and cam, stop means for establishing a direct drive connection between said driving means and said rotatable element through said cam and cam follower when said cam and cam follower are moved into predetermined relative positions, thereby to rotate said rotatable element and thus move said settable element in one direction toward said predetermined position, means for moving said settable element in the opposite direction toward said predetermined setting, and means including said last-named means and said stop means for arresting the movement of said settable element when said settable element is moved to said predetermined setting from either direction.

11. In control apparatus for rotating a rotatable element in either direction to a predetermined setting, driving means, a cam and cam follower assembly actuated by said driving means and including means for establishing a direct driving connection between said driving means and said element when the cam and cam follower are moved into predetermined relative positions, thereby to rotate said element in one direction, lost-motion means for establishing a different driving connection between said driving means and said element in order to drive said element in the opposite direction, and means including said assembly and said lost-motion means for locking said element against further rotation when said element is rotated to said predetermined setting from either direction.

12. In control apparatus for rotating a rotatable element in either direction to a predetermined setting, driving means, a pair of cam and cam follower units adapted to be actuated by said driving means to rotate said element in different directions and each including means for establishing a driving connection between said driving means and said element when the cam and cam follower of the unit are brought into a predetermined positional relationship, and means including at least a portion of the named parts of each of said units for arresting the rotation of said element when said element is rotated to said predetermined setting from either direction.

13. In control apparatus for rotating a rotatable element in either direction to a predetermined setting, a pair of parallel shafts, said rotatable element being carried by one of said shafts, driving means, a pair of spiral cam and cam follower units adapted to be actuated by said driving means to rotate said element in different directions and each including means for establishing a direct driving connection between said driving means and said element when the cam and cam follower are brought into a predetermined positional relationship, the parts of said units being respectively carried by different ones of said shafts, and mean including at least a portion of the named parts of each of said units for arresting the rotation of said element when said element is rotated in either direction to said predetermined setting.

14. In control apparatus which includes a rotary control shaft adapted to have a number of predetermined control settings, a pair of shafts, a plurality of control units each including a rotary actuating element mounted on said control shaft and additional coacting parts carried by said pair of shafts for driving the associated actuating element to rotate said control shaft to one of its settings, and means for individually and adjustably locking said actuating elements in different positions on said control shaft, thereby to define the predetermined settings to which said control shaft may be operated by the different control units.

15. In control apparatus, which includes a rotary control shaft adapted to have a number of settings, a pair of shafts extending parallel to each other and to said control shaft, a plurality of control units disposed axially along said shafts, each of said control units including an actuating element mounted on said control shaft and additional coacting parts carried by said pair of shafts for driving the associated actuating element to rotate said control shaft to one of its settings, and means for individually and adjustably locking said actuating elements in different angular positions relative to said control shaft, thereby to define the predetermined settings to which said control shaft may be operated by the different control units.

16. In control apparatus which includes a rotary control shaft adapted to have a number of settings, a pair of shafts extending parallel to each other and to said control shaft, a plurality of control units disposed axially along said shafts, each of said control units including an actuating element mounted on said control shaft and additional coacting parts carried by said pair of shafts for driving the associated actuating element to rotate said control shaft to one of its settings, a plurality of locking elements individual to said control units and extending axially of said shafts, and means coacting with said locking elements for individually and adjustably locking said actuating elements in different angular positions relative to said control shaft, thereby to define the predetermined settings to which said control shaft may be operated by the different control units.

17. In control apparatus which includes a rotary control shaft adapted to have a number of settings, a pair of shafts extending parallel to each other and to said control shaft, a plurality of control units disposed axially along said shafts, each of said control units including an actuating element mounted on said control shaft and additional coacting parts carried by said pair of shafts for driving the associated actuating element to rotate said control shaft to one of its settings, a plurality of locking elements individual to said control units and extending axially of said shafts, said first elements being of different lengths corresponding to the positions of said units along said shafts and being disposed radially about said control shaft, and coacting locking elements individual to said control units and each adapted for actuation by the associated first-named locking element to adjustably lock the associated actuating element in any desired angular position relative to said control shaft, whereby the predetermined settings to which said control shaft may be operated by the different control units may be defined by adjustment of said actuating elements relative to said control shaft.

18. In a control mechanism, a driving member and a driven member, said two members being axially fixed but freely rotatable relative to one another over an angular range in excess of 360°, a first stop means fixedly disposed on one of said members, a second stop means on the other of said members and movable with respect thereto for engagement with said first stop means to lock said members against relative rotation, an actuating device including a cam and a cam follower actuated simultaneously with said members for effecting relative movement of said first and second stop means to produce a locking engagement therebetween when said cam and cam follower have predetermined relative positions, and means for driving said members in unison when said locking engagement is effected.

19. In a control mechanism, a driving member and a driven member, said two members being axially fixed but freely rotatable relative to one another over an angular range in excess of 360°, a first stop means fixedly disposed on one of said members, a second stop means on the other of said members and movable with respect thereto for engagement with said first stop means to define the limits of said range and to lock said members against relative rotation, an actuating device including a cam and a cam follower actuated simultaneously with said members for effecting relative movement of said first and second stop means to produce a locking engagement therebetween when said cam and cam follower have predetermined relative positions, and means for driving said members in unison when said locking engagement is effected.

20. In a control mechanism, a driving member and a driven member, said two members being axially fixed but freely rotatable relative to one another over an angular range in excess of 360°, a first stop means, a second stop means for engagement with said first stop means to lock said members against relative rotation, an actuating device including a cam mounted fixedly disposed along with said first stop means on one of said members and a cam follower mounted along with said second stop means on the other of said members and movable with respect thereto, said cam and cam follower being actuated by said members and being effective to move said first and second stop means into locking engagement when said cam and cam follower have predetermined relative positions, and means for driving said members in unison when said locking engagement is effected.

21. In a control mechanism, two members being axially fixed but freely rotatable relative to one another in either of two directions over an angular range in excess of 360°, a first stop stop device on one of said members and movable with respect thereto, a pair of spaced stop devices fixedly disposed on the other of said members and individually engageable with said first stop device to define the limits of said range and to lock said members against relative rotation, and an actuating device including a cam and a cam follower actuated simultaneously with said members to engage said first stop device with one of said pair of stop devices in response to relative rotation of said members in one direction over said range and to engage said first stop device with the other of said pair in response to relative rotation of said members in the opposite direction over said range.

22. In a control mechanism, two members rotatable relative to one another in either of two directions over an angular range in excess of 360°, a first stop device on one of said members and movable with respect thereto, a pair of spaced stop devices fixedly disposed on the other of said members and individually engageable with said first stop device to define the limits of said range and to lock said members against relative rotation, and an actuating device including a convolute type of cam track on said other member between said pair of stop devices and a cam follower through which said first stop device is mounted on said one member, said cam and follower being actuated simultaneously with said members to engage said first stop device with one of said pair of stop devices in response to relative rotation of said members in one direction over said range and to engage said first stop device with the other of said pair in response to relative rotation of said members in the opposite direction over said range.

23. In a control mechanism, two members rotatable relative to one another in either of two directions over an angular range in excess of 360°, a first stop device on one of said members, a pair of stop devices spaced on the other of said members and individually engageable with said first stop device to define the limits of said range and to lock said members against relative rotation, and an actuating device including a convolute type of cam track on said other member between said pair of stop devices and a cam follower pivotally supported on said one member and carrying said one stop device, said cam and follower being actuated simultaneously with said members to engage said first stop device with one of said pair of stop devices in response to relative rotation of said members in one direction over said range and to engage said first stop device with the other of said pair in response to relative rotation of said members in the opposite direction over said range.

HAROLD F. ELLIOTT.

REFERENCES CITED

The following references are of record in the file of this patent:

UNITED STATES PATENTS

| Number | Name | Date |
|---|---|---|
| 448,806 | Brooks | Mar. 24, 1891 |
| 1,203,840 | Bailey | Nov. 7, 1916 |
| 1,859,531 | Ross | May 24, 1932 |
| 2,164,309 | Collins | July 4, 1939 |
| 2,174,552 | Collins | Oct. 13, 1939 |
| 2,217,066 | Manning et al. | Oct. 8, 1940 |
| 2,246,050 | Leishman | June 17, 1941 |
| 2,281,468 | Van Lammeren | Apr. 28, 1942 |
| 2,285,414 | Collins | June 9, 1942 |
| 2,293,299 | Mastney et al. | Aug. 18, 1942 |
| 2,293,355 | Olson et al. | Aug. 18, 1942 |
| 2,334,724 | Paessler | Nov. 23, 1943 |
| 2,349,146 | Dickson | May 16, 1944 |
| 2,378,941 | May | June 26, 1945 |